US012381987B2

(12) United States Patent
Mikami

(10) Patent No.: US 12,381,987 B2
(45) Date of Patent: Aug. 5, 2025

(54) INFORMATION PROCESSING APPARATUS, CONTROL METHOD THEREOF, STORAGE MEDIUM, AND IMAGE FORMING SYSTEM

(71) Applicant: CANON KABUSHIKI KAISHA, Tokyo (JP)

(72) Inventor: Ryo Mikami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/428,154

(22) Filed: Jan. 31, 2024

(65) Prior Publication Data

US 2024/0275894 A1     Aug. 15, 2024

(30) Foreign Application Priority Data

Feb. 10, 2023   (JP) .................................. 2023-019468

(51) Int. Cl.
*H04N 1/04* (2006.01)
*G06T 3/40* (2006.01)
(Continued)

(52) U.S. Cl.
CPC ........... *H04N 1/00442* (2013.01); *G06T 3/40* (2013.01); *G06T 7/001* (2013.01); *G06T 11/001* (2013.01);
(Continued)

(58) Field of Classification Search
CPC ........... H04N 1/00442; H04N 1/00005; H04N 1/00013; H04N 1/00037; H04N 1/00076;
(Continued)

(56) References Cited

U.S. PATENT DOCUMENTS

| 11,094,048 B2 | 8/2021 | Tsukamoto |
| 11,410,300 B2 | 8/2022 | Hirai et al. |

(Continued)

FOREIGN PATENT DOCUMENTS

| EP | 3779665 A1 | 2/2021 |
| JP | H10232933 A | 9/1998 |
| JP | 2007064642 A | 3/2007 |
| JP | 2020026091 A | 2/2020 |
| JP | 2021027582 A | 2/2021 |
| JP | 2021039476 A | 3/2021 |
| JP | 2021187085 A | 12/2021 |

OTHER PUBLICATIONS

IP.com search history (Year: 2024).*

(Continued)

*Primary Examiner* — Moustapha Diaby
(74) *Attorney, Agent, or Firm* — ROSSI, KIMMS & McDOWELL LLP

(57) ABSTRACT

An information processing apparatus obtains reference image data used for printing of a printed material, and obtains an image quality inspection result obtained by comparing read image data obtained by reading the printed material and the reference image data. The information processing apparatus also displays, on a display unit, an inspection result screen in accordance with the inspection result. A first region for displaying an entire image corresponding to read image data for a predetermined page among pages read from printed material is included in the inspection result screen. Furthermore, the inspection result screen includes a second region in which a normal enlarged image obtained by enlarging a normal image based on reference image data and an abnormal enlarged image obtained by enlarging an abnormal image based on the read image data are displayed in association for each abnormal portion included in the entire image.

19 Claims, 8 Drawing Sheets

(51) Int. Cl.
 *G06T 7/00* (2017.01)
 *G06T 11/00* (2006.01)
 *H04N 1/00* (2006.01)
 *H04N 1/06* (2006.01)
 *H04N 1/08* (2006.01)

(52) U.S. Cl.
 CPC ..... *H04N 1/00005* (2013.01); *H04N 1/00013* (2013.01); *H04N 1/00037* (2013.01); *H04N 1/00076* (2013.01); *H04N 1/00458* (2013.01); *H04N 1/00824* (2013.01); *G06T 2207/30144* (2013.01); *G06T 2207/30168* (2013.01)

(58) Field of Classification Search
 CPC .. H04N 1/00458; H04N 1/00824; G06T 3/40; G06T 7/001; G06T 11/001; G06T 2207/30144; G06T 2207/30168
 USPC .......................................................... 358/537
 See application file for complete search history.

(56) References Cited

U.S. PATENT DOCUMENTS

| 2014/0285852 | A1* | 9/2014 | Aikawa | B41F 33/0036 |
| | | | | 358/3.24 |
| 2015/0221077 | A1 | 8/2015 | Kawabata et al. | |
| 2022/0012867 | A1* | 1/2022 | Tsukamoto | G06F 3/121 |

OTHER PUBLICATIONS

ProQuest search history (Year: 2024).*
Extended European search report issued in European Appln. No. 24153352.0 mailed Sep. 3, 2024.

* cited by examiner

FIG. 8
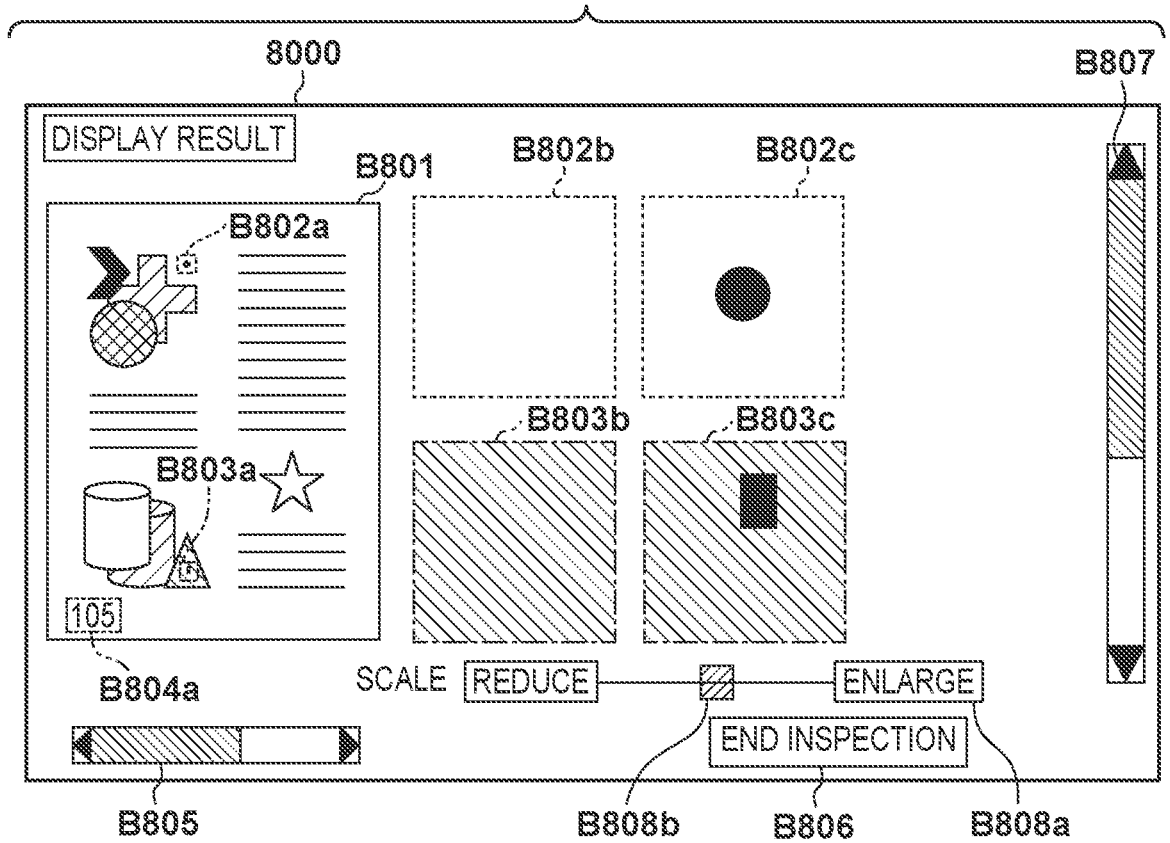
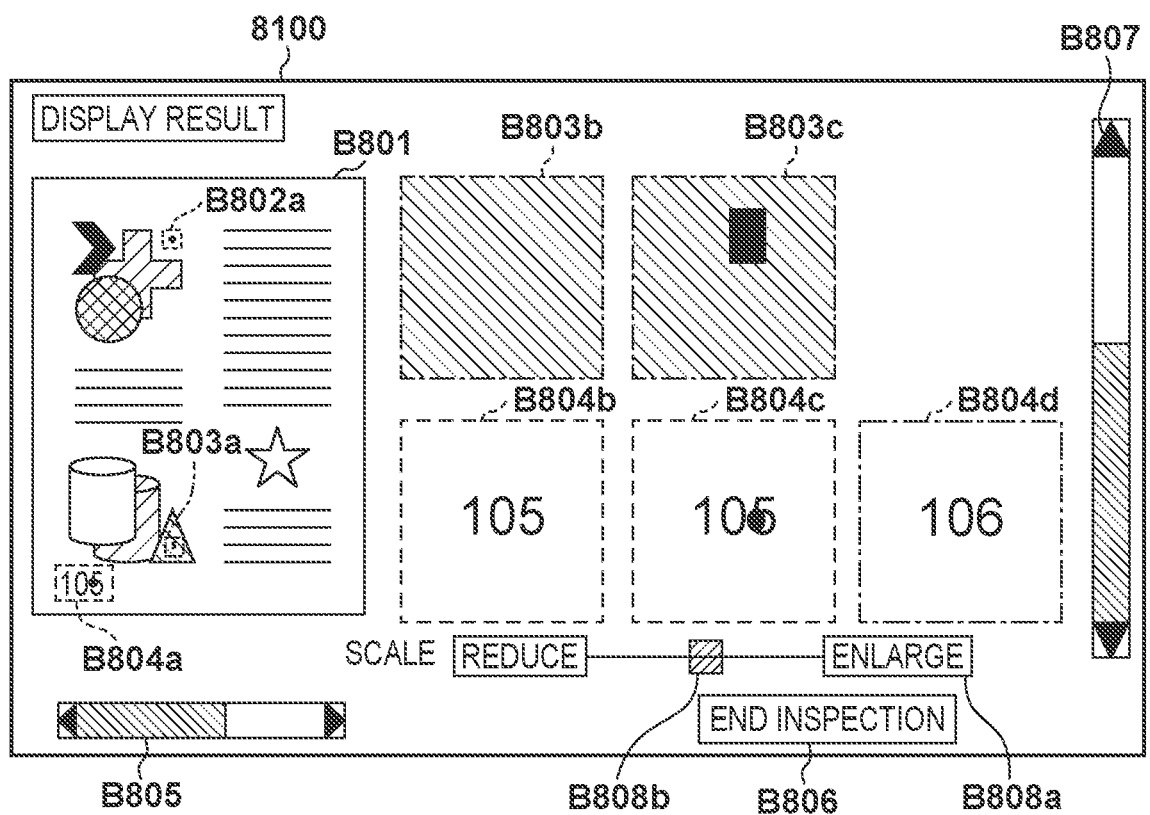

INFORMATION PROCESSING APPARATUS, CONTROL METHOD THEREOF, STORAGE MEDIUM, AND IMAGE FORMING SYSTEM

BACKGROUND OF THE INVENTION

Field of the Invention

The present invention relates to an information processing apparatus, a method for controlling the same, a storage medium, and an image forming system.

Description of the Related Art

Conventionally, there have been known image forming systems in which an inspection apparatus inspects whether or not an image formed by an image forming apparatus on a recording medium based on RIP (Raster Image Processor) data is formed in accordance with an image represented by that RIP data. The inspection apparatus compares the RIP data as reference data with scan data obtained by reading, with a sensor such as a scanner, an image formed on a recording medium, and inspects the image formed on the recording medium based on the comparison result.

Japanese Patent Laid-Open No. 2021-27582 describes that, in a case where an inspection result is NG (not good), a display indicating print jobs overall, a display indicating that all jobs that were NG, and a display of an NG location and an NG type (e.g., spot or streak) for a predetermined printed material among the jobs that were NG are displayed. As a result, the user can immediately ascertain an approximate NG location for a predetermined printed material of the job determined to be NG, and can shorten the time required for checking the NG location of the printed material.

In the aforementioned Japanese Patent Laid-Open No. 2021-27582, in a case where the print quality is NG, the approximate position and type of the abnormal portion can be ascertained instantaneously, but the extent of the abnormality cannot be determined instantaneously. Generally, in a case where the print quality is NG, the user checks the degree of abnormality and determines whether it is OK/NG. If the degree of abnormality cannot be determined instantaneously, it takes time to confirm the degree of abnormality, and usability suffers.

SUMMARY OF THE INVENTION

The present invention enables realization of improvement of usability when a user determines a degree of abnormality in a printed material.

One aspect of the present invention provides an information processing apparatus comprising: at least one memory device that stores a set of instructions; and at least one processor that executes the set of instructions to: obtain reference image data used for printing of a printed material; obtain an image quality inspection result obtained by comparing, by an inspection unit, read image data obtained by reading, by a reading unit, the printed material and the reference image data; and displaying, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, and the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed.

Another aspect of the present invention provides a method for controlling an information processing apparatus, the method comprising: obtaining reference image data used for printing of a printed material; obtaining an image quality inspection result obtained by comparing, by an inspection unit, read image data obtained by reading, by a reading unit, the printed material and the reference image data; and displaying, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, and the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed.

Still another aspect of the present invention provides a non-transitory computer-readable storage medium storing a program for causing a computer to execute each step in a method for controlling an information processing apparatus, the method for controlling comprising: obtaining reference image data used for printing of a printed material; obtaining an image quality inspection result obtained by comparing, by an inspection unit, read image data obtained by reading, by a reading unit, the printed material and the reference image data; and displaying, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, and the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed.

Yet still another aspect of the present invention provides an image forming system, comprising: at least one memory device that stores a set of instructions; and at least one processor that executes the set of instructions to: obtain reference image data used for printing of a printed material; use the reference image data to output a printed material; read the printed material; inspect image quality by comparing read image data and the reference image data; and display, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, and the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed.

Further features of the present invention will become apparent from the following description of exemplary embodiments (with reference to the attached drawings).

BRIEF DESCRIPTION OF THE DRAWINGS

FIG. 8 is a view illustrating an example of a result display screen according to an embodiment.

DESCRIPTION OF THE EMBODIMENTS

Figure 1:
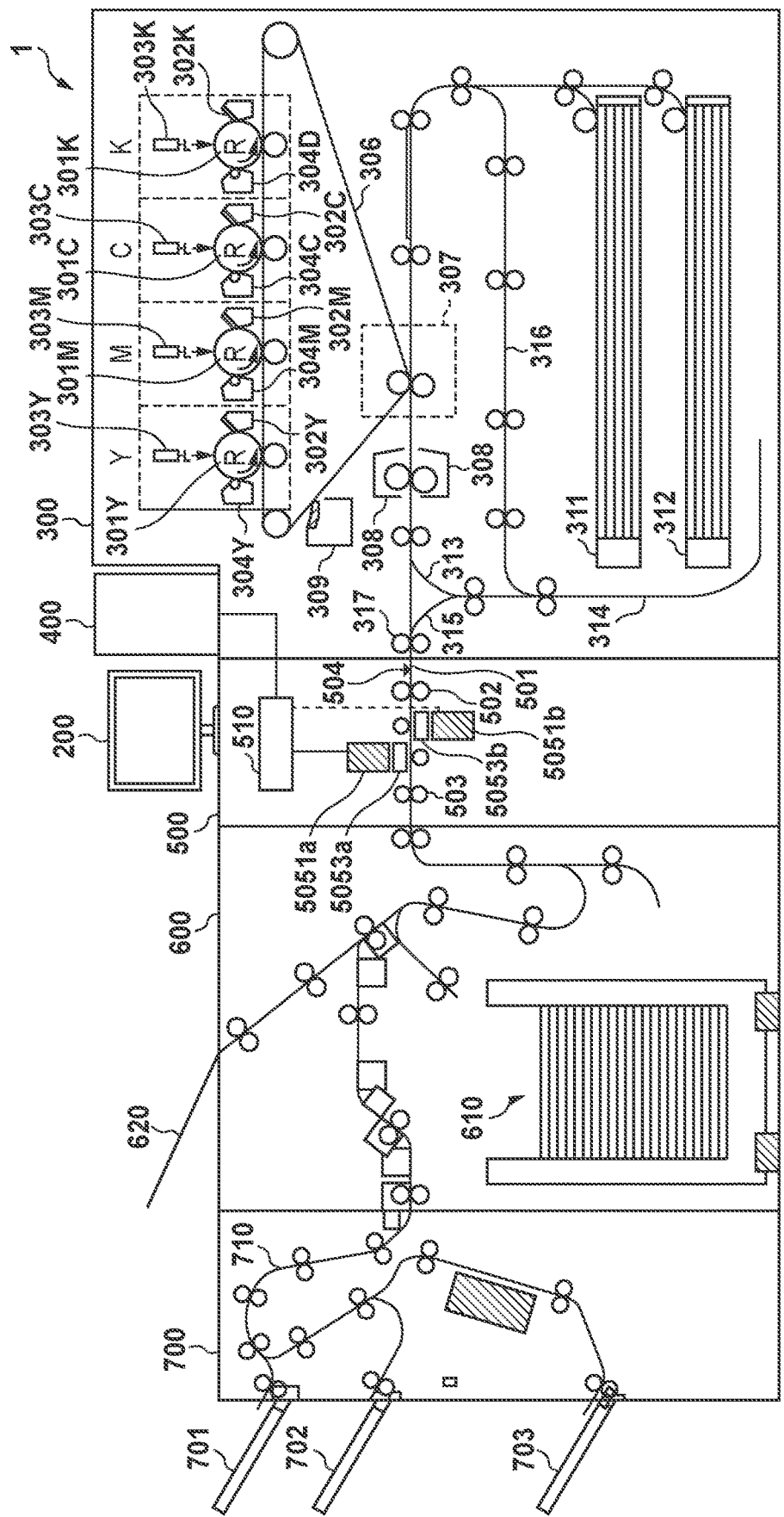
FIG. 1 is a diagram illustrating a configuration example of a system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of Image Forming System

Hereinafter, a first embodiment of the present invention will be described. First, a configuration example of an image forming system including an inspection apparatus according to the present embodiment will be described with reference to FIG. 1. An image forming system 1 includes an operation unit 200, a printer 300 serving as an image forming unit (printing means), a controller 400, an inspection apparatus 500 serving as an image inspection unit, a stacker 600, and a finisher 700 serving as a post-processing unit.

The operation unit 200 is a user interface including an input interface and an output interface. The input interface includes, for example, an input key and a touch panel device. The output interface includes, for example, devices such as a display, a speaker or the like. The operation unit 200 transmits an instruction or data input from the input interface to the controller 400. In addition, the operation unit 200 outputs information from the output interface in accordance with an instruction from the controller 400.

The controller 400 corresponds to an information processing apparatus, and controls operations of the printer 300, the inspection apparatus 500, the stacker 600, and the finisher 700 based on instructions and data input from the operation unit 200 or instructions and data obtained from an external apparatus via a network. For example, the controller 400 transmits an image forming instruction to the printer 300 when performing image forming. Details of the controller 400 will be described later. The controller 400 may be integrated with the printer 300 and provided as an image forming apparatus. In addition, the controller 400 may be provided with an inspection function of the inspection apparatus 500 described later. In this case, at least the printer 300, the controller 400, and the inspection apparatus 500 may be integrally formed and provided as an image forming system.

Printer

A configuration example of the printer will be described. The printer 300 of the present embodiment will be described using a color image forming apparatus that prints a color image on a sheet as an example. The present invention is not intended to be limited to a color image forming apparatus, and may be an image forming apparatus that prints a monochrome image. In this case, the type of the abnormality as the inspection item may be changed as appropriate. The printer 300 includes image forming units Y, M, C, and K, an intermediate transfer member 306, a transfer unit 307, a fixing device 308, sheet feeding cassettes 311 and 312, and a sheet feed mechanism. The image forming unit Y forms a yellow (Y) image. The image forming unit M forms a magenta (M) image. The image forming unit C forms a cyan (C) image. The image forming unit K forms a black (K) image. In the intermediate transfer member 306, images of respective colors formed by the image forming units Y, M, C, and K are transferred in an overlapping manner.

The transfer unit 307 transfers an image carried on the intermediate transfer member 306 to a sheet. The fixing device 308 fixes the image transferred to the sheet onto the sheet. Each of the image forming units Y, M, C, and K has the same configuration and forms an image by a similar operation. Here, the configuration of the image forming unit Y will be described, and the configuration of the image forming units M, C, and K will not be described.

The image forming unit Y includes a photosensitive drum 301Y, a charger 302Y, an exposure device 303Y, and a developing device 304Y. The photosensitive drum 301Y is a drum-shaped photosensitive member having photosensitive layers in the surface. During operation, the photosensitive drum 301Y rotates about a drum axis in the direction of arrow R. The charger 302Y uniformly charges the surface of the rotating photosensitive drum 301Y. The exposure device 303Y obtains image data representing a yellow image from the controller 400, and turns on and outputs a laser beam in accordance with the image data. The laser beam outputted from the exposure device 303Y scans the charged photosensitive drum 301Y surface in the direction of the drum axis. By the laser beam scanning the surface of the rotating photosensitive drum 301Y, an electrostatic latent image corresponding to the yellow image data is formed on the surface of the photosensitive drum 301Y. The developing device 304Y contains a yellow developer (e.g., toner), and develops an electrostatic latent image formed on the photosensitive drum 301Y with the developer. As a result, yellow images are formed on the surface of the photosensitive drum 301Y. The developing device 304Y is configured to be capable of constantly supplying developer from a toner cartridge (not illustrated). Similarly, a magenta image is formed on the photosensitive drum 301M of the image forming unit M. Similarly, a cyan image is formed on the photosensitive drum 301C of the image forming unit C. Similarly, a black image is formed on the photosensitive drum 301M of the image forming unit K.

The intermediate transfer member 306 is an endless belt member and rotates in a clockwise direction in the drawing. The intermediate transfer member 306 contacts each of the photosensitive drums 301Y, 301M, 301C, and 301K. As the intermediate transfer member 306 rotates, images of each of the colors are sequentially transferred from the respective photosensitive drums 301Y, 301M, 301C, and 301K so as to overlap. As a result, a full color image is formed on the intermediate transfer member 306. The intermediate transfer member 306 rotates to convey the full-color image to be carried to the transfer unit 307.

The sheet is stored in the sheet feeding cassettes 311 and 312, and is conveyed from the sheet feeding cassettes 311 and 312 to the transfer unit 307 by the feeding mechanism. The conveyance of the sheet is performed in accordance with the timing at which the image carried on the intermediate transfer member 306 is conveyed to the transfer unit 307. The transfer unit 307 transfers the image carried on the intermediate transfer member 306 to a sheet. A cleaner 309 is arranged downstream of the transfer unit 307 in the rotation direction of the intermediate transfer member 306. The cleaner 309 removes the developer remaining on the intermediate transfer member 306 after the transfer.

The sheet on which the image has been transferred is conveyed from the transfer unit 307 to the fixing device 308. The fixing device 308 includes a heater and a pressure roller. The fixing device 308 melts and fixes the image on the sheet by the heat generated by the heater and the pressure generated by the pressure roller. Conveyance paths 313, 314, and 315, a double-sided conveyance path 316, and a discharge roller 317 are provided downstream of the fixing device 308 in the conveyance direction of the sheet.

The sheet that has passed through the fixing device 308 is temporarily conveyed from the conveyance path 313 to the conveyance path 314. After the trailing edge passes through the conveyance path 313, the conveyance direction of the sheet is reversed and the sheet is conveyed from the conveyance path 315 to the discharge roller 317. With such conveyance, the sheet is discharged from the printer 300 by the discharge roller 317 in a state in which the surface on which the image is formed faces downward (face down). The printed material, which is the sheet after an image is formed thereon has been discharged from the printer 300 by the discharge roller 317, is transferred to the inspection apparatus 500.

In a case where double-sided printing is performed on a sheet, the sheet conveyed to the conveyance path 314 is conveyed to the double-sided conveyance path 316 after the trailing edge passes through the conveyance path 313. The sheet is conveyed again to the transfer unit 307 via the double-sided conveyance path 316. By passing through the double-sided conveyance path 316, a surface on which an image of a sheet is formed is reversed. The image transfer process by the transfer unit 307 and the fixing process by the fixing device 308 are performed on the reversed surface of the sheet. As a result, an image is also formed on that surface. The sheet on which an image is formed on both sides is discharged from the printer 300 by the discharge roller 317 as a printed material, and is transferred to the inspection apparatus 500.

Inspection Apparatus

Next, a configuration example of the inspection apparatus will be described. The inspection apparatus 500 compares the reference image data used for printing the printed material with the read image data obtained by reading the printed material, and inspects the image quality. The inspection apparatus 500 includes a conveyance path 501, an inspection control unit 510, a first reading unit 5051a, a second reading unit 5051b, flow reading glass 5053a and 5053b, conveyance rollers 502 and 503, and a sheet detection sensor 504.

The inspection control unit 510 controls the operation of the inspection apparatus 500 under the control of the controller 400. Details of the inspection control unit 510 will be described later. The first reading unit 5051a and the second reading unit 5051b are arranged at positions facing each other via the conveyance path 501. The conveyance rollers 502 and 503 convey the printed material.

The inspection apparatus 500 detects a printed material conveyed on the conveyance path 501 by the sheet detection sensor 504, and reads the printed images by the first reading unit 5051a and the second reading unit 5051b. The first reading unit 5051a and the second reading unit 5051b transmit the printed material reading result to the inspection control unit 510. The inspection control unit 510 performs quality inspection of an image printed on the printed material based on the result of reading the printed material. Since the first reading unit 5051a and the second reading unit 5051b are arranged so as to face each other via the conveyance path 501, images printed on both sides of the printed material are read in one conveyance of the printed material. The printed material from which the image has been read is conveyed from the inspection apparatus 500 to the stacker 600.

Stacker, Finisher

A configuration example of the stacker and the finisher will be described. The stacker 600 includes a large-capacity tray 610 and a purge tray 620. The stacker 600 discharges the printed material to one of the large-capacity tray 610, the finisher 700, and the purge tray 620 based on the instruction from the controller 400 and the result of the quality inspection by the inspection control unit 510. That is, the printed material can be classified and discharged according to the result of the quality inspection. For example, a printed material determined to be NG in quality inspection may be discharged to the purge tray 620, and a printed material determined to be OK in quality inspection may be discharged to the large-capacity tray 610 or the finisher 700.

The finisher 700 includes a printed material conveyance unit 710 including a plurality of conveyance rollers and a conveyance path, an upper sheet discharge tray 701, a middle sheet discharge tray 702, and a lower sheet discharge tray 703. The printed material conveyance unit 710 includes switching mechanisms 711 and 712 for switching the discharge destination of the printed material. The finisher 700 sequentially takes in the printed material from the stacker 600, and discharges the printed material to any one of the upper sheet discharge tray 701, the middle sheet discharge tray 702, and the lower sheet discharge tray 703 in response to an instruction from the controller 400. The finisher 700 may be configured to perform post-processing such as stapling processing for bundling and binding a plurality of printed materials, bookbinding processing for the bundled printed materials, and cutting processing for the bundled printed materials.

Controller

Figure 2:
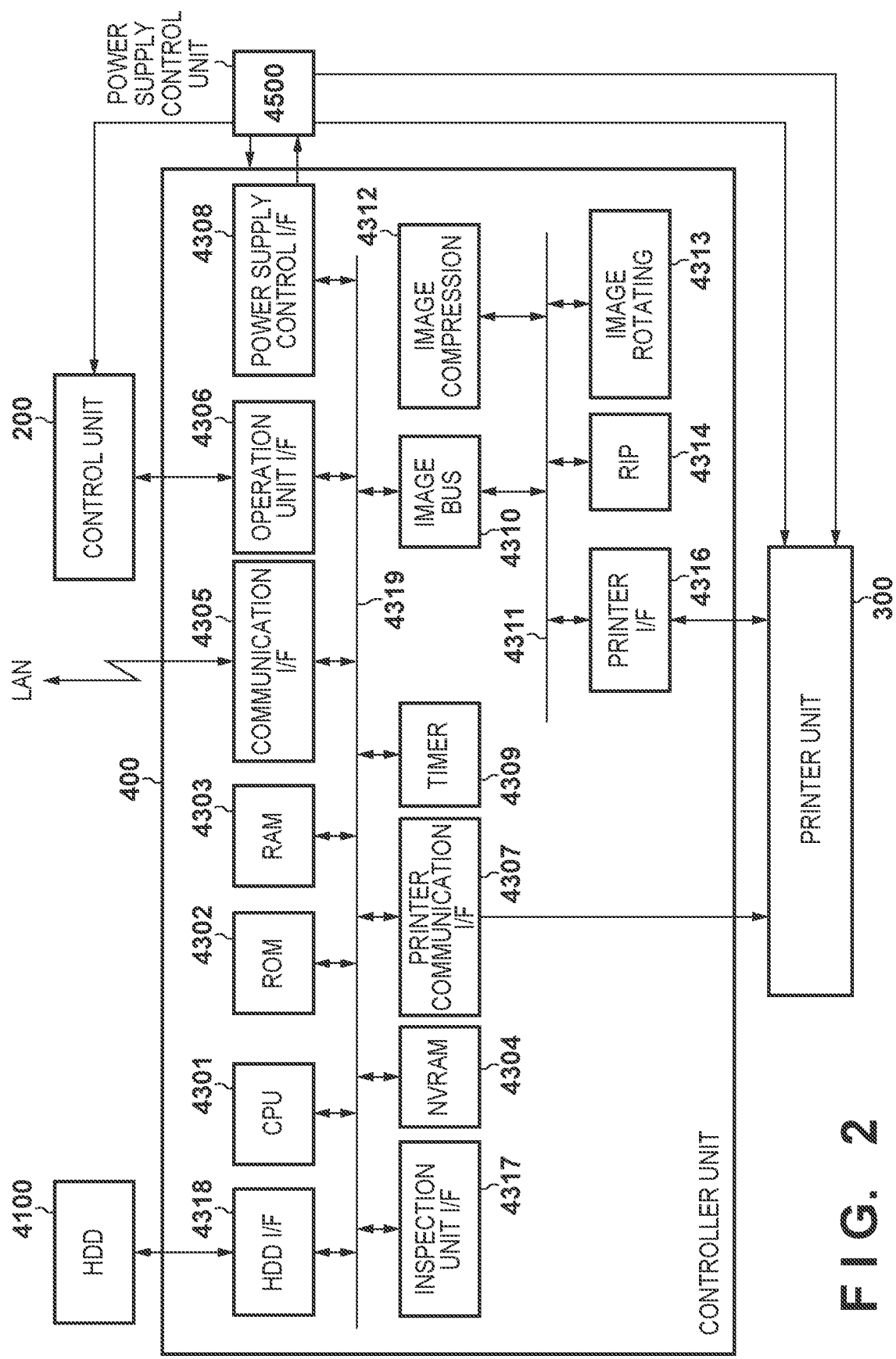
FIG. 2 is a diagram illustrating a configuration example of a controller according to an embodiment.

Next, an example configuration of the controller 400 according to the present embodiment will be described with reference to FIG. 2. The storage 4100 is a large-capacity storage apparatus such as the HDD (Hard Disk Drive), SSD (Solid State Drive).

In addition to the printer 300, the inspection apparatus 500, and the operation unit 200, and also the storage 4100 and a power supply control unit 4500 are connected to the controller 400. The controller 400 includes an HDD I/F (the term "I/F" throughout the specification indicates an interface) 4318, an operation unit I/F 4306, a power supply control I/F 4308, an inspection unit I/F 4317, a printer communication I/F 4307, and a printer I/F 4316 as interfaces to the respective units connected thereto. The controller 400 also includes a communication I/F 4305 for communicating with an external apparatus over a network. A storage I/F 4318, the operation unit I/F 4306, the power supply control I/F 4308, the inspection unit I/F 4317, the printer communication I/F 4307, and the communication I/F 4305 are connected to a system bus 4319.

The controller 400 includes a Central Processing Unit (CPU) 4301, a Read Only Memory (ROM) 4302 and a Random Access Memory (RAM) 4303. The CPU 4301 controls the operation of the image forming system 1 by executing a computer program stored in the ROM 4302. The RAM 4303 provides a work region for when the CPU 4301 performs processing. The RAM 4303 is also used as an image memory for temporarily storing image data and the like. The CPU 4301, the ROM 4302, and the RAM 4303 are also connected to the system bus 4319. An NVRAM (Non-Volatile RAM) 4304 and a timer 4309 are also connected to the system bus 4319. The NVRAM 4304 stores various control parameters. The timer 4309 holds the current time and monitors the elapse of the set time.

The operation unit I/F 4306 performs communication control with the operation unit 200. The operation unit I/F 4306 receives input to the controller 400 such as a print job, a command, and a print setting, from the operation unit 200, and transmits the input to the CPU 4301. The operation unit I/F 4306 displays various screens and the state of the image forming system 1 on the operation unit 200 under the control of the CPU 4301. The printer communication I/F 4307 performs communication control with the printer 300 under the control of the CPU 4301. The power supply control I/F 4308 instructs the power supply control unit 4500 to supply/ stop various types of power according to an instruction from the CPU 4301. The power supply control unit 4500 supplies power to the printer 300. The inspection unit I/F 4317 performs communication control with the inspection apparatus 500 under the control of the CPU 4301. The storage I/F 4318 performs communication control with the storage 4100 under the control of the CPU 4301.

The communication I/F 4305 is connected to a network such as a Local Area Network (LAN), and performs communication control such as transmission/reception of electronic mail and input/output of PDL data from an external apparatus. The communication I/F 4305 includes an NVRAM (not illustrated) and holds various parameters related to communication control such as a MAC address.

The system bus 4319 is connected to an image bus 4311 via an image bus I/F 4310. The bus I/F 4310 is a bridge connecting the system bus 4319 and the image bus 4311 for transferring image data to the printer 300. The printer I/F 4316, an image compression unit 4312, an image rotation unit 4313, and a Raster Image Processor (RIP) 4314 are connected to the image bus 4311.

The image compression unit 4312 performs JPEG, JBIG, MMR, or MH compression/decompression processing, or the like. The image rotation unit 4313 performs image rotation processing. A RIP 4314 expands PDL (Page Description Language) code into a raster image of the bitmap. The printer I/F 4316 transmits image data to the printer 300. The image data is generated by the controller 400 performing image processing for the printer 300 such as correction of the printer 300 and resolution conversion on the image data for print output.

Inspection Control Unit

Figure 3:
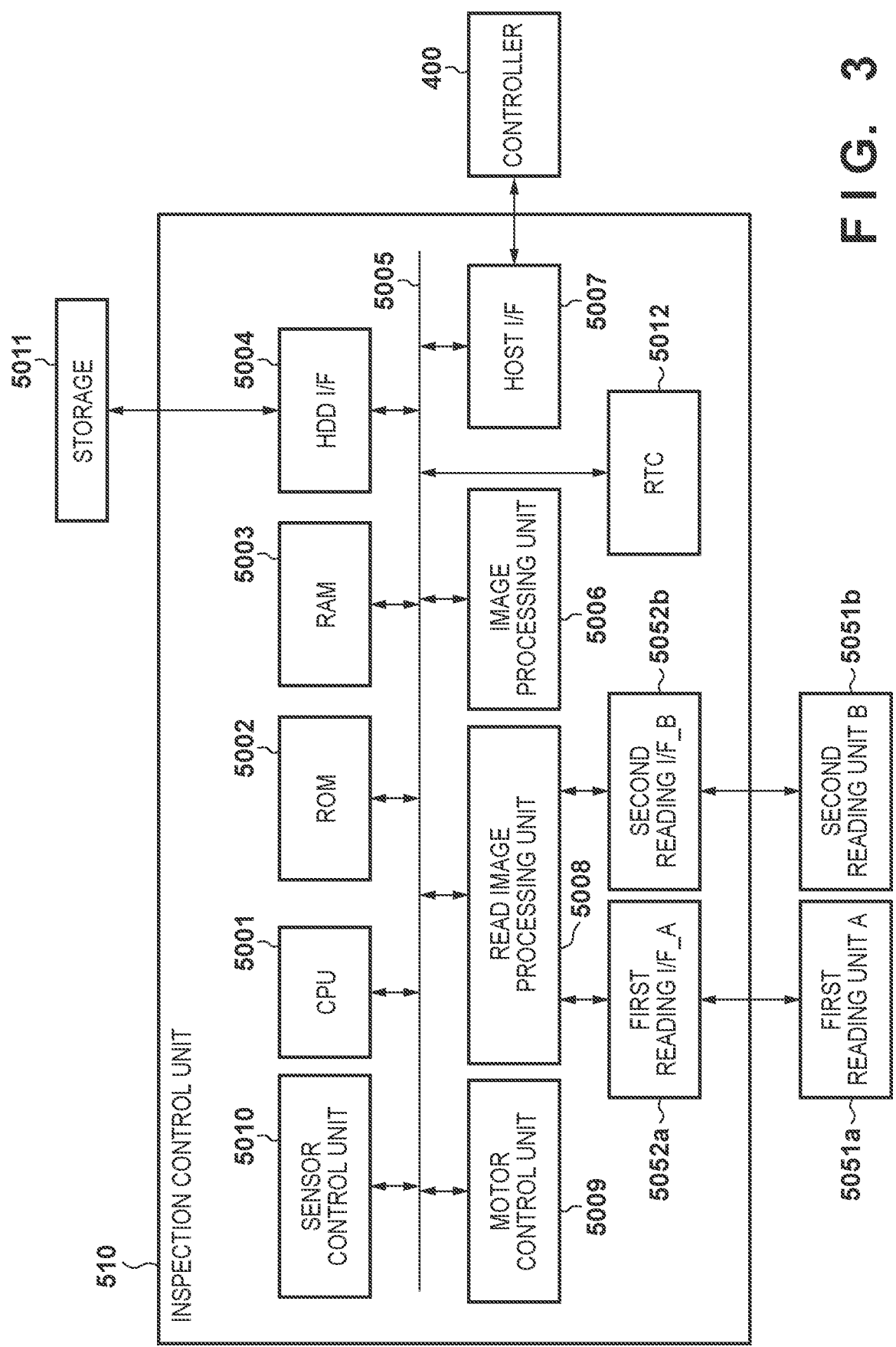
FIG. 3 is a diagram illustrating a configuration example of an inspection control unit according to an embodiment.

Next, a configuration example of the inspection control unit 510 of the inspection apparatus 500 according to the present embodiment will be described with reference to FIG. 3. The inspection control unit 510 controls the operations of the first reading unit 5051a and the second reading unit 5051b.

The inspection control unit 510 performs processes such as analysis of the reading results of the first reading unit 5051a and the second reading unit 5051b, operation control of the inspection apparatus 500, and communication with the controller 400. Further, the inspection control unit 510 is connected to a storage 5011 and the controller 400 for storing the positional deviation correction profile and the like.

The inspection control unit 510 includes a CPU 5001, a ROM 5002, a RAM 5003, a storage I/F 5004, a motor control unit 5009, a read image processing unit 5008, an image processing unit 5006, an RTC 5012, a host I/F 5007, and a sensor control unit 5010. Each unit is connected to a system bus 5005. The read image processing unit 5008 is connected to the first reading unit 5051a via the first reading I/F 5052a, and is connected to the second reading unit 5051b via the second reading I/F 5052b.

The RTC 5012 is a real-time clock and holds the present time with high accuracy. The host I/F 5007 controls communication with the inspection unit I/F 4317 of the controller 400. In a case where the inspection control unit 510 and the controller 400 communicate with each other, data is transmitted and received between the host I/F 5007 and the inspection unit I/F 4317. For example, the host I/F 5007 obtains image data used in the image forming operation of the printer 300 from the controller 400. The storage 5011 is a large-capacity storage apparatus such as an HDD or an SSD. The storage 5011 stores the aforementioned image data as reference image data to be described later.

The CPU 5001 controls the operation of the inspection apparatus 500 by executing a computer program stored in the ROM 5002. The RAM 5003 provides a work region when the CPU 5001 performs processing. The storage I/F 5004 controls communication with the storage 5011 connected to the inspection control unit 510.

The read image processing unit 5008 obtains, under the control of the CPU 5001, the result of reading an image of the printed material from the first reading unit 5051a via the first reading I/F 5052a. The read image processing unit 5008 obtains, under the control of the CPU 5001, the result of reading an image of the printed material from the second reading unit 5051b via the second reading I/F 5052b. Under the control of the CPU 5001, the read image processing unit 5008 performs a scaling process, a gamma correction process, or the like on the read result (read data) of the image of the printed material obtained from the first reading unit 5051a and the second reading unit 5051b to generate read image data. The generated read image data is stored in the RAM 5003. The first reading unit 5051a and the second reading unit 5051b have sensor arrays, and can read the entire region of the printed material conveyed through the conveyance path 501. The first reading unit 5051*a* reads an image of the first surface of the printed material, and the second reading unit 5051*b* reads an image of the second surface of the printed material.

The first reading unit 5051*a* and the second reading unit 5051*b* include a light emitting unit and a light receiving unit. The light-emitting unit is made of, for example, white Light Emitting Diode (LED). The light receiving unit is constituted by, for example, a CMOS sensor with RGB color filters. The light emitting unit irradiates the printed material conveyed through the conveyance path 501 with light under the control of the CPU 5001. The light receiving unit separates the reflected light from the printed material into three color components of RGB by color filters, receives the light, and outputs read data as a light receiving result (reading result). The read data is transmitted to the read image processing unit 5008.

The motor control unit 5009 controls the operation of various motors provided in the inspection apparatus 500 under the control of the CPU 5001. The sensor control unit 5010 controls the operation of the various sensors provided in the inspection apparatus 500 under the control of the CPU 5001, and notifies the CPU 5001 of the detection result of the sensor. The image processing unit 5006, under the control of the CPU 5001, compares the image data (hereinafter, referred to as "reference image data") stored in the storage 5011 and the read out image data stored in the RAM 5003, and performs a printed material quality inspection.

The reference image data is image data used for image formation by the printer 300, and is stored in the storage 5011. Alternatively, the reference image data may be an image obtained by reading the reference image in advance before performing the quality inspection. At the time of comparison, the image processing unit 5006 performs correction processing on the reference image data using a parameter according to calibration described later.

Setting Screen

Figure 4:
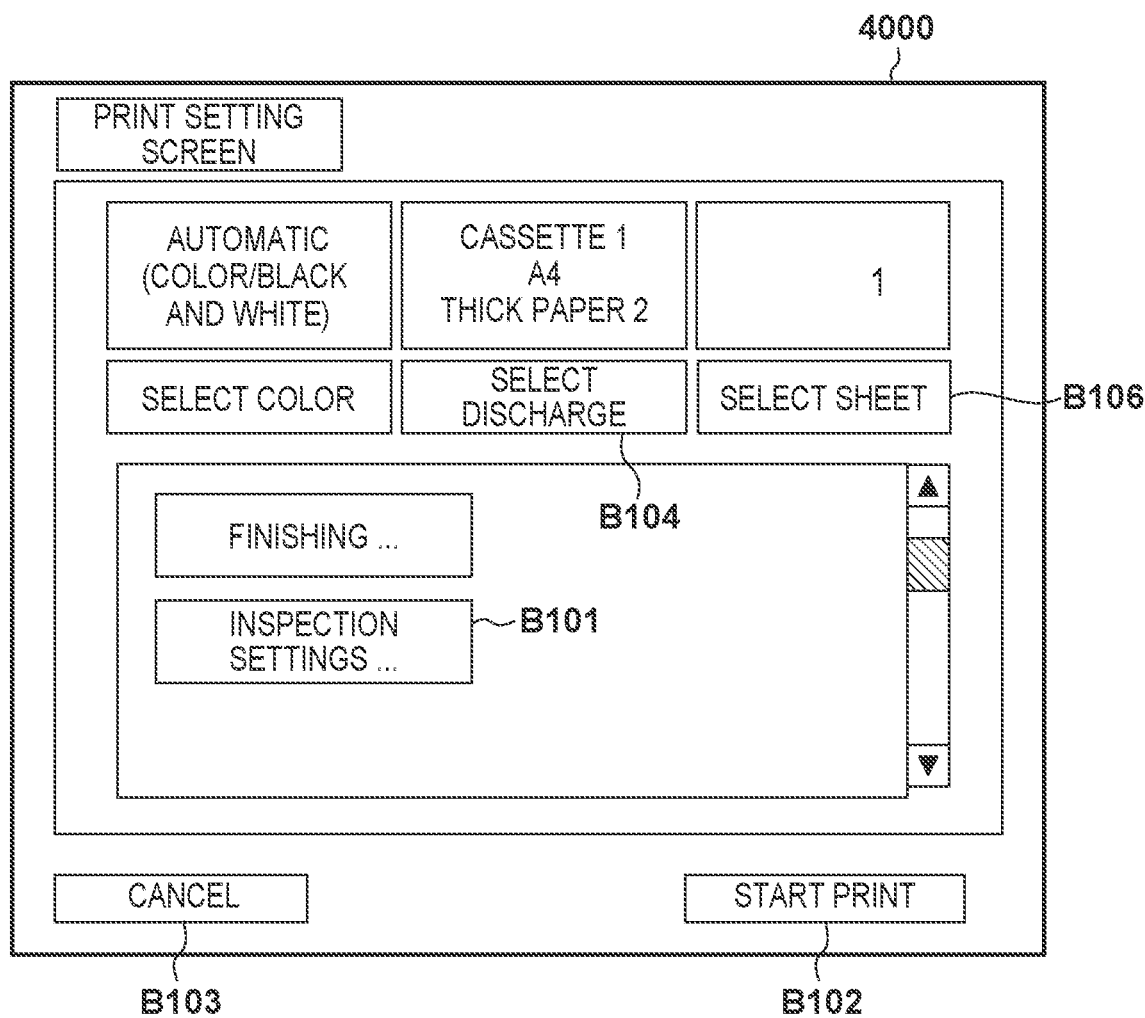
FIG. 4 is a view illustrating an example of a print setting screen according to an embodiment.

Next, an example of a setting screen displayed on the operation unit 200 according to the present embodiment will be described with reference to FIG. 4 and FIG. 5. FIG. 4 illustrates a print setting screen 4000 displayed on the display of the operation unit 200 in an inspection printing process involving quality inspection of a printed material. The operator uses the operation unit 200 to set the items of the quality inspection by using these operation screens, which are displayed on the display, and instructs execution of the inspection printing procedure.

The print setting screen 4000 is a setting screen related to print processing, and can be set as to whether or not to perform quality inspection. The operator can select the color of printing (color/black and white), select the type of sheet, set the discharge destination or the like of the printed material, select to execute calibration, and the like by operating buttons B101 to B106 displayed in the print setting screen 4000. When the operator operates a button B101 which is an inspection setting button, the screen transitions from the print setting screen 4000 to an inspection setting screen 5000 illustrated in FIG. 5. In a case where a button B102, which is a print start button, is operated, printed material formation is started without performing a quality inspection by the inspection apparatus 500. In a case where a button B103, which is a cancel button, is operated, the content set on the print setting screen 4000 is cancelled, and a predetermined default screen is displayed on the display of the operation unit 200. Setting of a discharge destination of the printed material is performed by button B104 which is a discharge tray setting button. By operating a sheet selection button B106, it is possible to check and change the size, the basis weight, and the like of sheets placed in the sheet feeding cassettes 311 and 312, and to designate a cassette for paper feed.

Figure 5:
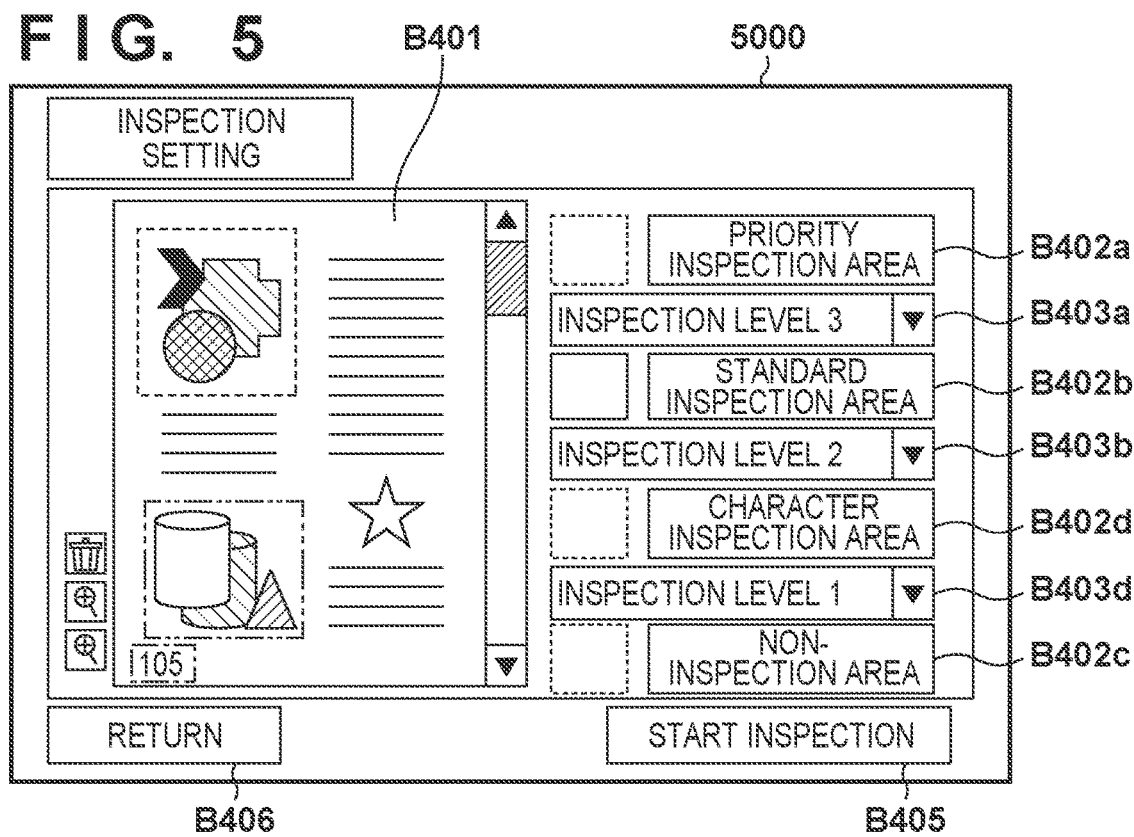
FIG. 5 is a view illustrating an example of an inspection setting screen according to an embodiment.

FIG. 5 illustrates the inspection setting screen 5000 displayed on the display of the operation unit 200 when the button B101 is selected in FIG. 4. The inspection setting screen 5000 is a setting screen for receiving an instruction from a user for setting an inspection area in which an inspection such as a quality inspection by the inspection apparatus 500 is to be executed. In the drawing, an area B401 is a print image and an inspection setting area display unit. In the area B401, a document image (that is, a reference image) in the print job is displayed, and an inspection area can be set by the user selecting a predetermined part of the image display region of the area B401 after having selected one of inspection area type buttons indicated by the buttons B402*a* to B402*d*. As a selection method, an operation of selecting a predetermined object existing in the image displayed in the area B401 may be used. Alternatively, the operation may be an operation of tracing the inspection area on a touch panel or an operation of selecting the area by a drag operation via a pointing device. In the area B401, as illustrated in FIG. 5, the selected inspection areas are displayed to be surrounded by different frame lines, for example, a solid line, a dashed line, an alternate long and short dashed line, or the like for each type.

The buttons B402*a* to B402*d* are buttons indicating inspection area types. The button B402*a* is a priority inspection area button for setting a region for performing highly accurate inspection. The button B402*b* is a standard inspection area button that sets a global inspection level. The button B402*c* is a non-inspection area button for designating a region where inspection is not performed. The button B402*d* is a character inspection area button for recognizing and inspecting characters, bar codes, and the like. Here, four buttons are displayed so as to be selectable, but the number of buttons displayed is not intended to be limited, and may correspond to the number of types of abnormality to be inspected.

The buttons B403*a*, B403*b*, and B403*d* are inspection level setting buttons for setting the inspection level accuracy in steps such as levels 1 to 5 for each inspection area type. The user can set an inspection level for each region of the buttons B402*a* and B402*b*. Here, the lowest inspection accuracy is inspection level 1, and as the number of inspection levels increases, the inspection accuracy increases. A higher inspection accuracy means that the condition for determining that there is no abnormality becomes more severe.

A button B405 is an inspection start button, and when the user selects this button, the inspection printing process is started. A button B406 is a button for returning to the previous screen, and when the user selects this button, the inspection setting process is cancelled, and the print setting screen 4000 is returned to.

In the inspection setting screen 5000, for example, a region for which it is necessary to perform a highly accurate inspection can be arbitrarily selected by selecting a button B402*a* and selecting the region for performing the highly accurate inspection using a mouse, a touch panel, or the like. In the example illustrated in FIG. 5, high-precision inspection is performed for shapes such as a circle or a cross. In addition, since it is not necessary to carry out high-precision inspection for cylindrical or triangular shapes, a non-inspection area is set therefor. Therefore, compared with the case where the entire image is inspected without such selection, it is possible to reduce the memory required for the inspection and the processing capability required. Further, by setting the inspection level in stages such as level 1 to level 5, it is possible to suppress the memory and the processing capacity required for the inspection as compared with the case where the inspection is always performed with the highest level of accuracy.

Result Display Screen

Figure 6:
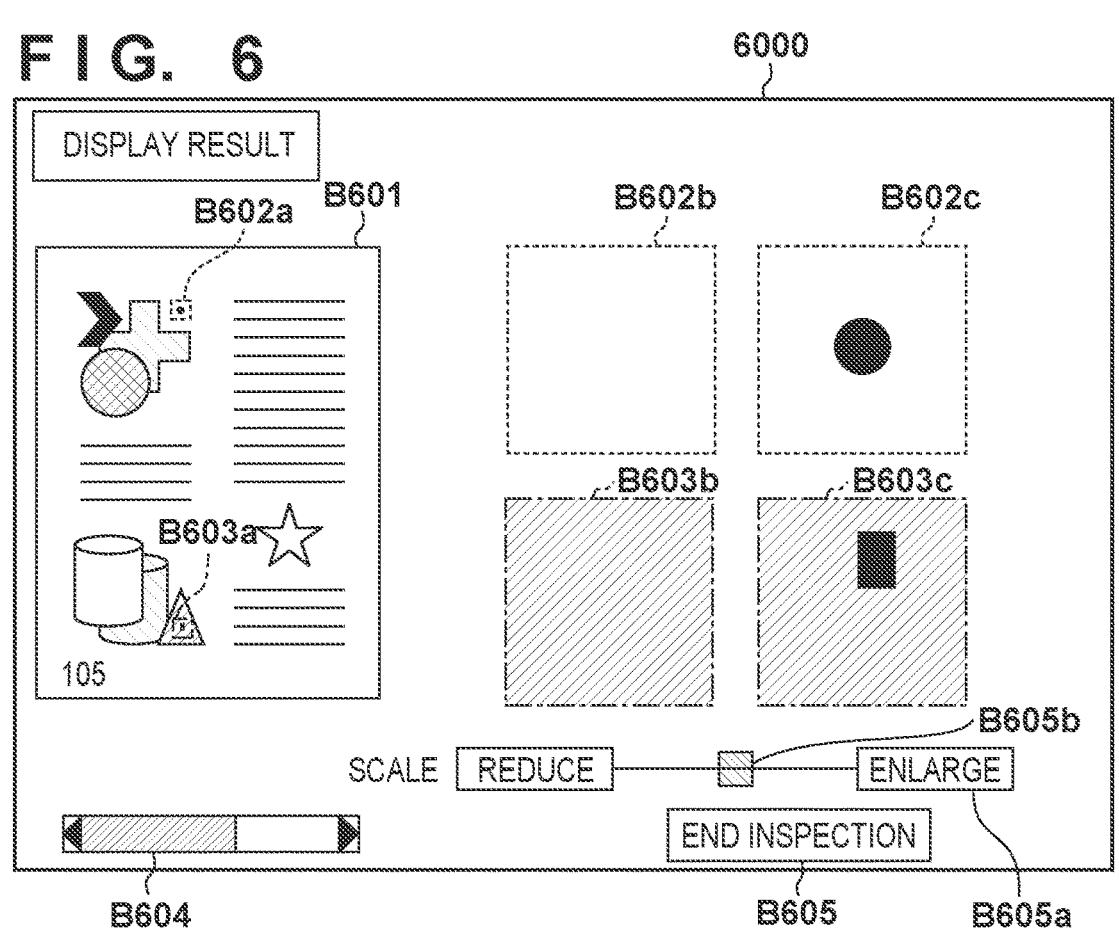
FIG. 6 is a view illustrating an example of a result display screen according to an embodiment.

Next, referring to FIG. 6, an example of an inspection result screen 6000 for a case where the inspection result of a printed material according to the present embodiment is NG will be described. In the present embodiment, an example in which the inspection result screen 6000 is displayed on the operation unit 200 by the CPU 4301 of the controller 400 will be described. However, the present invention is not limited thereto, and the inspection result screen 6000 may be displayed on the display unit of the inspection apparatus 500 or another apparatus, for example, an external apparatus connected via a network. In this case, the CPU 4301 of the controller 400 transmits screen information for displaying the inspection result screen 6000 to the inspection apparatus 500 or the external apparatus. The CPU 4301 is an example of a display control unit and a transmitting unit. B601 is an area (a first region) for displaying the entire image determined to be NG in a print inspection and an abnormal portion determined to be NG. On the other hand, B602 and B603 described below are areas (second regions) in which a normal enlarged image and an abnormal enlarged image are displayed.

B602a (a region surrounded by a dashed line) included in an area B601 is displayed to indicate a position of a first abnormality in the entire image determined to be NG in the printed material inspection. In addition, B602b indicates an enlarged image in a normal state (that is, a reference image) of the position of B602a. Here, it is illustrated that a blank is the image in the normal state. B602c indicates an abnormal enlarged image of the position of B602a. As described above, by displaying the normal enlarged image and the abnormal enlarged image to be arranged in the vicinity of each other, it is possible to easily confirm a degree of abnormality. That is, according to the present embodiment, the normal enlarged image obtained by enlarging a normal image based on reference image data and the abnormal enlarged image obtained by enlarging an abnormal image based on the read image data are displayed in association for each abnormal portion included in the entire image. Here, as an example, the normal enlarged image and the abnormal enlarged image are displayed side by side. Of course, any form of display may be used as long as it is a method of displaying in association.

It is assumed that the enlargement ratio of B602b is the same as the enlargement ratio of B602c. Further, the enlargement ratio may be changeable in B605a. Specifically, the enlargement ratio of the abnormal enlarged image and the normal enlarged image can be changed by operating an operation button B605b to the left and right. For example, the image may be reduced when the operation button B605b is operated to the left, and the image may be enlarged when the operation button is operated to the right. The operation button is only one example of an operation object, and while an example of a slide bar is illustrated here, other forms of operation object may be employed. For example, an operation object capable of inputting a numerical value of an enlargement ratio may be employed. When changing the enlargement ratio, it is desirable to change the normal enlarged image and the abnormal enlarged image in the same manner.

Here, an example is illustrated in which the enlargement ratio of all normal enlarged images and abnormal enlarged images is simultaneously changed. However, an operation object for changing the enlargement ratio as illustrated in B602a may be provided for each set of the normal enlarged image and the corresponding abnormal enlarged image, and the enlargement ratio may be changed for each set. Further, the scale of the entire images displayed in the area B601 may be changed. In this case, the enlargement ratio of each enlarged image may be changed in conjunction with the change of the enlargement ratio of the entire image. In addition, it is desirable to increase the enlargement ratio of each enlarged image from the enlargement ratio of the entire image in the same manner as the enlargement ratio before the enlargement change.

In addition, in the case of enlarging both the entire image and the enlarged image, the user may cause the enlargement to be centered on a portion (abnormal portion) to be focused on. As a result, it is possible to prevent an abnormal portion from not being displayed in the enlarged image. Alternatively, the center position of the image may be changed in accordance with a drag operation of a pointing device or the like. This makes it possible to change the enlargement ratio of the image according to the user's intention.

B603a included in an area B601 (a region surrounded by an alternate long and short dashed line) is displayed to indicate a position of a second abnormality in the entire image determined to be NG in the printed material inspection. B603b indicates a normal enlarged image of the position of B603a. Here, it is illustrated that a blank is the image in the normal state. B603c indicates an abnormal enlarged image of the position of B603a. It is assumed that the enlargement ratio of B603b is the same as the enlargement ratio of B603c. Similar to B602, the enlargement ratio may be changed by user operation.

B604 is a scroll bar (operation object) that switches pages of jobs determined to be NG in the printed material inspection, and pages of NG images can be switched by moving the bar to the left and right. Areas B602 and B603 for displaying the abnormal enlarged image and the normal image are also switched to a display of the corresponding image in accordance with the switching of the page. In addition, in the case where an area for displaying an enlarged image exceeds the upper limit on what is to be displayed at one time in accordance with locations where an abnormality has occurred, a scroll bar is displayed, and enlarged images of abnormal portions that are not displayed are displayed by operating the bar. B605 is an inspection end button; when the user performs an operation thereon after confirming the printed material inspection, the printed material inspection can be ended.

As described above, according to the present embodiment, when an NG is determined, for each NG image, the entire image B601 determined to be NG in the printed material inspection, as well as normal enlarged images (B602b and B603b) and abnormal enlarged images (B602c and B603c) are simultaneously displayed on one screen. Therefore, the user can easily confirm abnormal parts from NG images of printed materials discharged to respective discharge destinations. In addition, since normal enlarged images (B602b and B603b) and abnormal enlarged images (B602c and B603c) can be simultaneously compared, it is possible to shorten the determination as to whether or not the abnormality is to be allowed. In general, when an NG is determined, the time it takes to determine allowability and optimize the inspection level can be shortened, and downtime of the apparatus can be reduced. As a result, usability when the user determines the degree of abnormality in a printed material can be improved.

Also, in a case where there are a plurality of images for which an NG is determined, simultaneously to an entire image determined to be NG in the printed material inspection being switched to a next image by the operation of B604, the normal enlarged images and the abnormal enlarged images corresponding to the abnormal portions are displayed in combination with the respective image. In addition, the association between B602a and B602b and B602c, or B603a and B603b and B603c is distinguished by the shapes of the frame lines, that is, a solid line, a dashed line, an alternate long and short dashed line, and the like, but is not limited thereto. For example, the association may be distinguished by the color of the frame lines.

Print Inspection Process Flow

Figure 9:
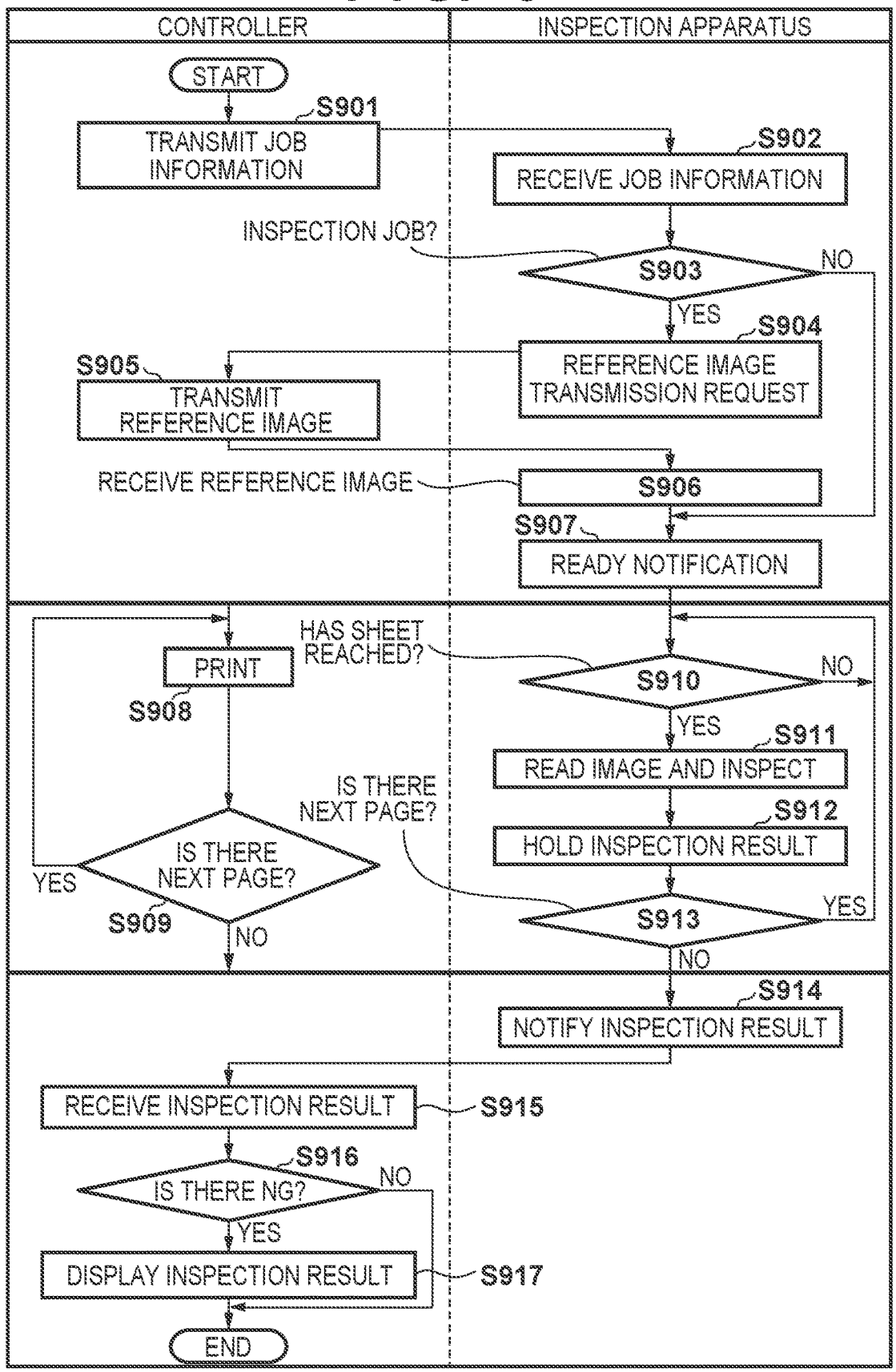
FIG. 9 is a flowchart illustrating a processing procedure of a print inspection according to an embodiment.

Next, with reference to FIG. 9, a processing procedure of the inspection printing process according to the present embodiment will be described. Note that FIG. 9 is a diagram collectively illustrating processes that are executed by the CPU 4301 of the controller 400 and the CPU 5001 of the inspection apparatus 500 respectively. The process is executed by the user selecting the print start button B102 in FIG. 4. The processes described below are realized by, for example, the CPU 4301 of the controller 400 and the CPU 5001 of the inspection apparatus 500 each reading a program stored in ROM or an HDD into RAM and executing the program.

In step S901, the CPU 4301 of the controller 400 receives the selection of the print start button B102 via the operation unit 200, and transmits job information including sheet information to be used in printing, inspection settings, a discharge destination, and the like to the inspection apparatus 500. Meanwhile, in step S902, the CPU 5001 of the inspection apparatus 500 receives the job information transmitted from the controller 400.

Subsequently, in step S903, the CPU 5001 of the inspection apparatus 500 determines, after receiving the job information from the controller 400, whether the print job is a job requiring inspection, based on the job information received in step S902. In the case of a job requiring inspection (step S903: Yes), the process proceeds to step S904, and the CPU 5001 of the inspection apparatus 500 sends to the controller 400 a request for transmission of the reference image data for inspection determination, and the process transitions to step S905. On the other hand, in a case where it is not a job that needs to be inspected (step S903: No), the process transitions to step S907.

In step S905, the CPU 4301 of the controller 400 transmits the document image data of the print job to the inspection apparatus as the reference image data, based on the request for transmission of the reference image data of the inspection apparatus 500. Subsequently, in step S906, the CPU 5001 of the inspection apparatus 500 receives the reference image data from the controller 400 and stores it in the storage 5011. In addition, in step S907, the CPU 5001 of the inspection apparatus 500 notifies the controller 400 that the print job is ready upon completion of receiving the reference image data.

Next, in step S908, the CPU 4301 of the controller 400 executes a print process together with the printer unit on the basis of the ready notification of the inspection apparatus 500. Then, in step S909, the CPU 4301 of the controller 400 determines whether or not there is a next page, and continues printing until the set number of sheets of the print job is printed. When the print is completed, step S914 is transitioned to.

On the other hand, in step S910 after the ready notification is made in step S907, the CPU 5001 of the inspection apparatus 500 determines whether or not the sheet has reached the conveyance path 501 of the inspection apparatus 500 by using the sheet detection sensor 504. The CPU 5001 of the inspection apparatus 500 waits until the sheet is fed in a case where the sheet has not reached the path (step S910: No). When it is determined that the sheet has reached the path (step S910: Yes), the CPU 5001 of the inspection apparatus 500 causes the first reading unit 5051a and the second reading unit 5051b to sequentially read the sheet to be fed in step S911. Further, the CPU 5001 instructs the image processing unit 5006 to perform processing to compare against the reference image data received in step S906. As a result, the image processing unit 5006 executes the comparison process and performs the image inspection.

Next, in step S912, the CPU 5001 of the inspection apparatus 500 holds the inspection results obtained by the comparison in the image processing unit 5006 in the RAM 5003. Thereafter, in step S913, the CPU 5001 of the inspection apparatus 500 determines whether or not the next page is printed based on the received job information, and in a case where there is a next page (step S913: Yes), the process is executed again from step S910 and the inspection process is continued. In a case where there is no next page (step S913: No), the process transitions to step S914.

In step S914, the CPU 5001 of the inspection apparatus 500 transmits the inspection result held in step S912 to the controller 400. In step S915, the CPU 4301 of the controller 400 receives the inspection results transmitted from the CPU 5001 of the inspection apparatus 500. Subsequently, in step S916, the CPU 4301 of the controller 400 determines whether or not there is an NG within the received inspection results, and in a case where there is an NG (step S916: Yes), the process transitions to step S917, and in a case where there is no NG (step S916: No), the print inspection process ends. In step S917, the CPU 4301 of the controller 400 controls the operation unit 200 to display the inspection result screen 6000 described with reference to FIG. 6 on the operation unit 200. When the user selects the inspection end button B605 after confirming the abnormal portions, the CPU 4301 of the controller 400 ends the print inspection process.

Although an example in which the controller 400 and the inspection apparatus 500 cooperate to execute the inspection process has been described here, the configuration of the image forming system is not intended to be limited, and other configurations may be adopted. For example, the controller 400 may be integrated with the printer 300 and provided as an image forming apparatus. Further, the inspection apparatus 500 may be integrally provided. Further, the inspection result screen may be displayed on a display unit of the inspection apparatus 500 or a display unit of an external apparatus.

As described above, the information processing apparatus according to the present embodiment obtains the reference image data used for printing the printed material, and obtains the inspection result of the image quality obtained by the inspection unit comparing the read image data obtained by the reading unit reading the printed material with the reference image data. Further, the information processing apparatus displays the inspection result screen on the display unit according to the inspection result. The inspection result screen includes a first region for displaying an entire image corresponding to read image data for a predetermined page among pages read from printed material. Furthermore, the inspection result screen includes a second region in which a normal enlarged image obtained by enlarging a normal image based on reference image data and an abnormal enlarged image obtained by enlarging an abnormal image based on the read image data are displayed in association for each abnormal portion included in the entire image. Thereby, when the printed material inspection is NG, for each NG image, the entire image determined to be NG in the printed material inspection as well as the normal enlarged image and the abnormal enlarged image are simultaneously displayed, and thereby a determination as to allowability of an abnormality of the printed material by the user is favorably supported, the time it takes to optimize the inspection level is shortened, and the downtime of the apparatus can be reduced. As a result, usability when the user determines the degree of abnormality in a printed material can be improved.

Second Embodiment

Below, a second embodiment of the present invention will be described. All the apparatus configurations of the present embodiment are similar to those of the first embodiment described above, and differ only in the features of the operation unit screen when the printed material inspection is NG; therefore only differences will be described here. In the present embodiment, an example will be described in which an inspection result is displayed for an abnormality of a type different from the inspection type of the abnormality described in the above first embodiment.

Inspection Result Image

Figure 7:
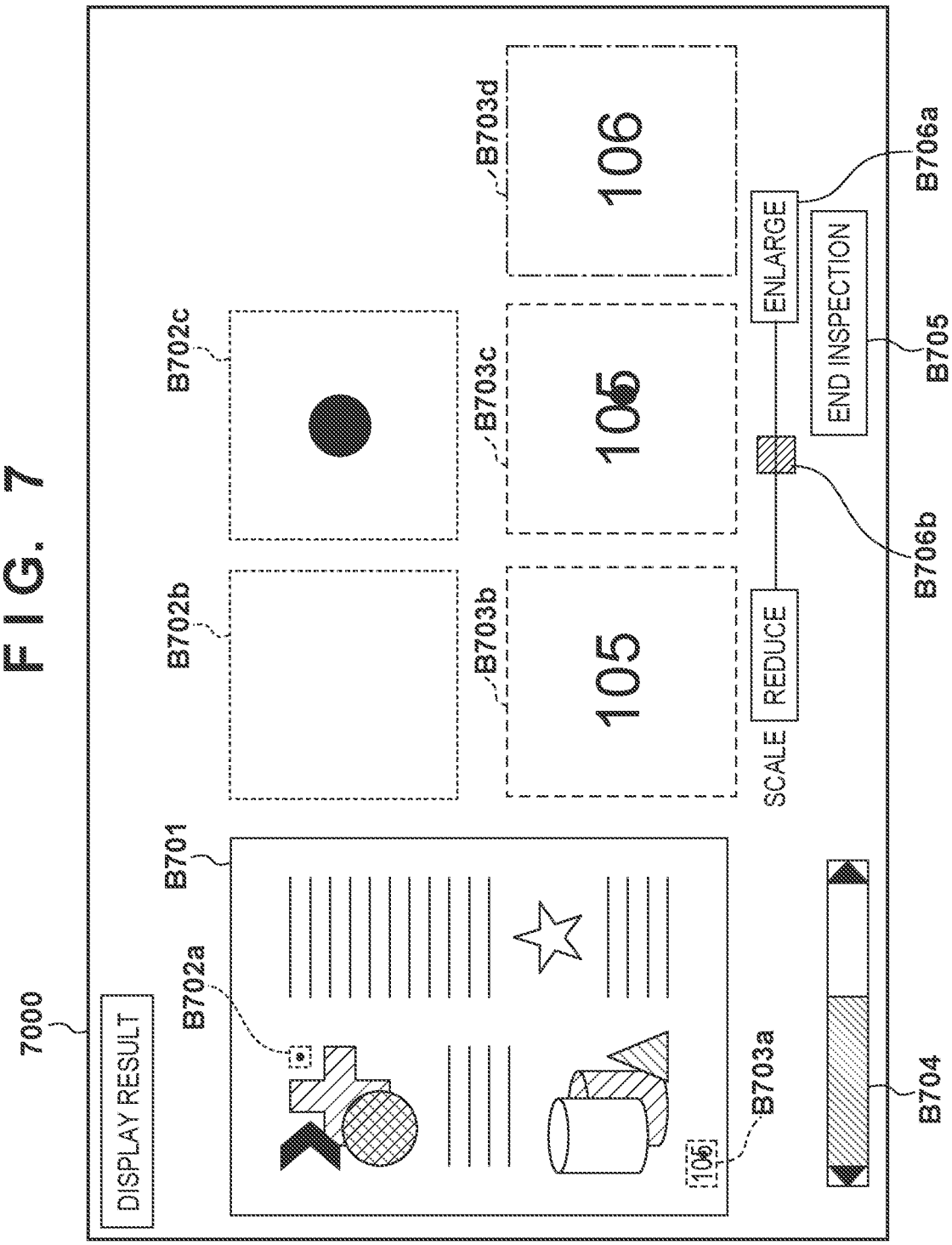
FIG. 7 is a view illustrating an example of a result display screen according to an embodiment.

Next, referring to FIG. 7, an example of an inspection result screen 7000 for a case where the inspection result of a printed material according to the present embodiment is NG will be described. B701 is an area for displaying the entire image determined to be NG in a print inspection and an abnormal portion determined to be NG.

B702a (a region surrounded by a dashed line) included in an area B701 is displayed to indicate a position of a first abnormality in the entire image determined to be NG in a printed material inspection. B702b indicates a normal enlarged image of the position of B702a. Here, it is illustrated that a blank is the image in the normal state. B702c indicates an abnormal enlarged image of the position of B702a. As described above, by displaying the normal enlarged image and the abnormal enlarged image to be arranged in the vicinity of each other, it is possible to easily confirm a degree of abnormality.

It is assumed that the enlargement ratio of B702b is the same as the enlargement ratio of B702c. Further, the enlargement ratio may be changeable in B706a. Specifically, the enlargement ratio of the abnormal enlarged image and the normal enlarged image can be changed by operating an operation button B706b to the left and right. Enlargement ratio operations and variations thereof are similar to those in B605a of the above first embodiment, and thus detailed explanation thereof is omitted.

B703a (a region surrounded by a large-dash line) included in an area B701 is displayed to indicate a position of a second abnormality in the entire image determined to be NG in a printed material inspection. The second abnormality in the present embodiment is an abnormality that has occurred in a region designated as a character inspection area by operating the button B402d in FIG. 5, which is the character inspection area button. B703b indicates a normal character string of the position of B703a, and B703c indicates an abnormal enlarged image of the position of B703a. B703d indicates a character recognition (decoding) result of the character inspection area. Here, since the character recognition result is "106" and is different from the normal value "105", it is possible to easily confirm that an abnormality has occurred in the image formation of the "5".

According to the present embodiment, in addition to the simultaneous display of the normal character string and the abnormal image, and the character recognition (decoding) result is also displayed for the second abnormality, which is a character inspection abnormality. In this case, the user can instantaneously recognize that the character recognition (decoding) result is different from the normal character string as a result of a character misrecognition of due to an abnormality such as a spot overlapping the character from B703c.

B704 is a scroll bar that switches pages of jobs determined to be NG in the printed material inspection, and pages of NG images can be switched by moving the bar to the left and right. B705 is an inspection end button; when the user performs an operation thereon after confirming the printed material inspection, the printed material inspection can be ended.

As described above, according to the present embodiment, when an NG is determined, for each NG image, the entire image B701 determined to be NG in the printed material inspection, as well as a normal enlarged image (B702b) and an abnormal enlarged image (B702c) are simultaneously displayed for a first abnormality. Further, for a second abnormality, a normal character string (B703b), an abnormal enlarged image (B703c), and the character recognition (decoding) result (B703d) of a character inspection area are simultaneously displayed. That is, in the present embodiment, information to be simultaneously displayed is switched depending on the inspection type. Information suitable for distinguishing the cause of the NG determination differs depending on the inspection type, and so an inspection result screen in which such information is displayed simultaneously is provided. Thus, even in the case of a job with more inspection types, the user can shorten the time for determining allowability and the time for optimization of the inspection level after an NG is determined, and can reduce the downtime of the apparatus. As a result, usability when the user determines the degree of abnormality in a printed material can be improved.

Third Embodiment

Hereinafter, a third embodiment of the present invention will be described. All the apparatus configurations of the present embodiment are similar to those of the first and second embodiments described above, and differ only in the features of the inspection result screen when an NG is determined; therefore only differences will be described here. In the present embodiment, an example will be described in which enlarged images of all abnormal portions are displayed using a scroll bar in a case where the abnormal portions exceed an upper limit that can be displayed at one time.

Inspection Result Screen

Next, referring to FIG. 8, examples of inspection result screens 8000 and 8100 for a case where the inspection result of a printed material according to the present embodiment is NG will be described. In the inspection result screen 8000, B801 is an area for displaying the entire image determined to be NG in a print inspection and an abnormal portion determined to be NG.

B802a (a region surrounded by a dashed line) included in an area B801 is displayed to indicate a position of a first abnormality in the entire image determined to be NG in the printed material inspection. B802b indicates a normal enlarged image of the position of B802a. Here, it is illustrated that a blank is the image in the normal state. B802c indicates an abnormal enlarged image of the position of B802a. B808a and the operation button B808b are similar to those in the above first embodiment, and therefore will not be described.

B803a included in an area B801 (a region surrounded by an alternate long and short dashed line) is displayed to indicate a position of a second abnormality in the entire image determined to be NG in the printed material inspection. B803b indicates a normal enlarged image of the position of B803a. B803c indicates an abnormal enlarged image of the position of B803a.

B804a (a region surrounded by a large-dash line) included in an area B801 is displayed to indicate a position of a third abnormality in the entire image determined to be NG in the printed material inspection. In the inspection result screen 8000, detailed information such as a normal character string and an abnormal enlarged image corresponding to B804a cannot be displayed on the inspection result screen 8000, so that the detailed information is not displayed.

B805 is a scroll bar that switches pages of jobs determined to be NG in the printed material inspection, and pages of NG images can be switched by moving the bar to the left and right. B806 is an inspection end button; when the user performs an operation thereon after confirming the printed material inspection, the printed material inspection can be ended.

B807 is a scroll bar for switching the detailed information of the first to third abnormalities. By moving the bar up and down, the display of the detailed information of the first to third abnormalities can be switched. As illustrated in the inspection result screen 8000, when the scroll bar B807 is at the top, detailed information of the first abnormality and the second abnormality is displayed. That is, here, in a case where the normal enlarged image and the abnormal enlarged image of the detected abnormal portion exceed the upper limit that can be displayed, an enlarged image of a part of the abnormal portion is displayed, and an enlarged image of the other abnormal portion is not displayed. A state in which the scroll bar B807 is at the bottom is illustrated in an inspection result screen 8100.

In the inspection result screen 8100, the area of the detailed information is scrolled downward, and the detailed information of the third abnormality is displayed instead of the detailed information of the first abnormality being hidden. B804b indicates a normal character string of the position of B804a, and B804c indicates an abnormal enlarged image of the position of B804a. B804d indicates a character recognition (decoding) result of the character inspection area. Accordingly, in addition to the simultaneous display of the normal character string and the abnormal enlarged image, the character recognition (decoding) result is also displayed for the third abnormality, which is a character inspection abnormality for the character inspection area.

As described above, according to the present embodiment, the detailed information for the respective abnormalities can be switched in the display in conjunction with the up and down operations of the scroll bar B807. Therefore, even in a case where the number of abnormal portions exceeds the number that can be displayed at the same time, it is possible to sequentially display detailed information on all the abnormalities. Thus, even in the case of a job with many abnormal portions, the user can shorten the time for determining allowability and the time for optimization of the inspection level after an NG in a printed material inspection, and can thereby reduce the downtime of the apparatus. As a result, usability when the user determines the degree of abnormality in a printed material can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-019468, filed Feb. 10, 2023, which is hereby incorporated by reference herein in its entirety.

What is claimed is:

1. An information processing apparatus comprising:
at least one memory device that stores a set of instructions; and
at least one processor that executes the set of instructions to:
obtain reference image data used for printing of a printed material;
obtain an image quality inspection result obtained by comparing, by an inspection unit, read image data obtained by reading, by a reading unit, the printed material and the reference image data; and
displaying, on a display unit, an inspection result screen in accordance with the inspection result,
wherein a first region and a second region are included in the inspection result screen,
in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed, and in the inspection result screen, in a case where abnormal portions detected by the inspection unit exceed an upper limit to be displayed at one time in the second region, together with displaying the normal enlarged image and abnormal enlarged image corresponding to a portion of the abnormal portions, a first operation object for switching to a display of a non-displayed normal enlarged image and abnormal enlarged image is displayed.

2. The information processing apparatus according to claim 1, wherein in the second region of the inspection result screen, the normal enlarged image and the abnormal enlarged image are displayed side by side for each of a plurality of abnormal portions.

3. The information processing apparatus according to claim 1, wherein in the inspection result screen, a second operation object for changing an enlargement ratio of the normal enlarged image and the abnormal enlarged image displayed in the second region is displayed.

4. The information processing apparatus according to claim 3, wherein the second operation object is displayed for each one of a plurality of combinations of normal enlarged images and corresponding abnormal enlarged images.

5. The information processing apparatus according to claim 3, wherein when the second operation object is operated, the enlargement ratio of the normal enlarged image and the abnormal enlarged image is changed in a similar way.

6. The information processing apparatus according to claim 3, wherein when the second operation object is operated, an enlargement ratio is changed for each set of the normal enlarged image and the abnormal enlarged image corresponding to the normal enlarged image.

7. The information processing apparatus according to claim 1, wherein in the inspection result screen, a second operation object for changing an enlargement ratio of the entire image displayed in the first region is displayed.

8. The information processing apparatus according to claim 7, wherein when the second operation object is operated, an enlargement ratio of the normal enlarged image and the abnormal enlarged image displayed in the second region is changed in conjunction with a change in the enlargement ratio of the entire image.

9. The information processing apparatus according to claim 1, wherein an abnormal portion of the entire image displayed in the first region and the corresponding normal enlarged image and abnormal enlarged image displayed in the second region are displayed to be surrounded by lines of different shapes for each one of a plurality of abnormal portions.

10. The information processing apparatus according to claim 1, wherein an abnormal portion of the entire image displayed in the first region and the corresponding normal enlarged image and abnormal enlarged image displayed in the second region are displayed to be surrounded by lines of different colors for each one of a plurality of abnormal portions.

11. The information processing apparatus according to claim 1, wherein in the inspection result screen, in a case where a type of abnormality of an abnormal portion is an abnormality according to a character recognition, an image indicating a character recognition result is displayed in addition to the normal enlarged image and the abnormal enlarged image in the second region.

12. The information processing apparatus according to claim 1, wherein the first operation object is a scroll bar.

13. The information processing apparatus according to claim 1, wherein the at least one processor executes instructions in the memory device to:

set an inspection level for determining an abnormality for each type of abnormality for which to perform an inspection.

14. The information processing apparatus according to claim 1, wherein the at least one processor executes instructions in the memory device to:

transmit information of the inspection result screen to an external apparatus.

15. The information processing apparatus according to claim 1, further comprising:

an image forming unit configured to output the printed material using the reference image data, wherein the information processing apparatus is an image forming apparatus.

16. The information processing apparatus according to claim 15, further comprising:

the reading unit and the inspection unit.

17. A method for controlling an information processing apparatus, the method comprising:

obtaining reference image data used for printing of a printed material;

obtaining an image quality inspection result obtained by comparing, by an inspection unit, read image data obtained by reading, by a reading unit, the printed material and the reference image data; and displaying, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed, and in the inspection result screen, in a case where detected abnormal portions exceed an upper limit to be displayed at one time in the second region, together with displaying the normal enlarged image and abnormal enlarged image corresponding to a portion of the abnormal portions, an operation object for switching to a display of a non-displayed normal enlarged image and abnormal enlarged image is displayed.

18. A non-transitory computer-readable storage medium storing a program for causing a computer to execute each step in a method for controlling an information processing apparatus, the method for controlling comprising:

obtaining reference image data used for printing of a printed material;

obtaining an image quality inspection result obtained by comparing, by an inspection unit, read image data obtained by reading, by a reading unit, the printed material and the reference image data; and displaying, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed, and in the inspection result screen, in a case where detected abnormal portions exceed an upper limit to be displayed at one time in the second region, together with displaying the normal enlarged image and abnormal enlarged image corresponding to a portion of the abnormal portions, an operation object for switching to a display of a non-displayed normal enlarged image and abnormal enlarged image is displayed.

19. An image forming system, comprising:

at least one memory device that stores a set of instructions; and at least one processor that executes the set of instructions to:

obtain reference image data used for printing of a printed material;

use the reference image data to output a printed material;

read the printed material;

inspect image quality by comparing read image data and the reference image data; and display, on a display unit, an inspection result screen in accordance with the inspection result, wherein a first region and a second region are included in the inspection result screen, in the first region, for a predetermined page among pages read from the printed material, an entire image corresponding to the read image data and an abnormal portion in the entire image are displayed, and in a second region, a normal enlarged image and an abnormal enlarged image corresponding to the abnormal portion are displayed, the normal enlarged image is an image for which an image of a position corresponding to the abnormal portion in the reference image data is enlarged and displayed, and the abnormal enlarged image is an image for which an image of a position corresponding to the abnormal portion in the read image data is enlarged and displayed, and in the inspection result screen, in a case where detected abnormal portions exceed an upper limit to be displayed at one time in the second region, together with displaying the normal enlarged image and abnormal enlarged image corresponding to a portion of the abnormal portions, an operation object for switching to a display of a non-displayed normal enlarged image and abnormal enlarged image is displayed.

* * * * *